Nov. 8, 1927.

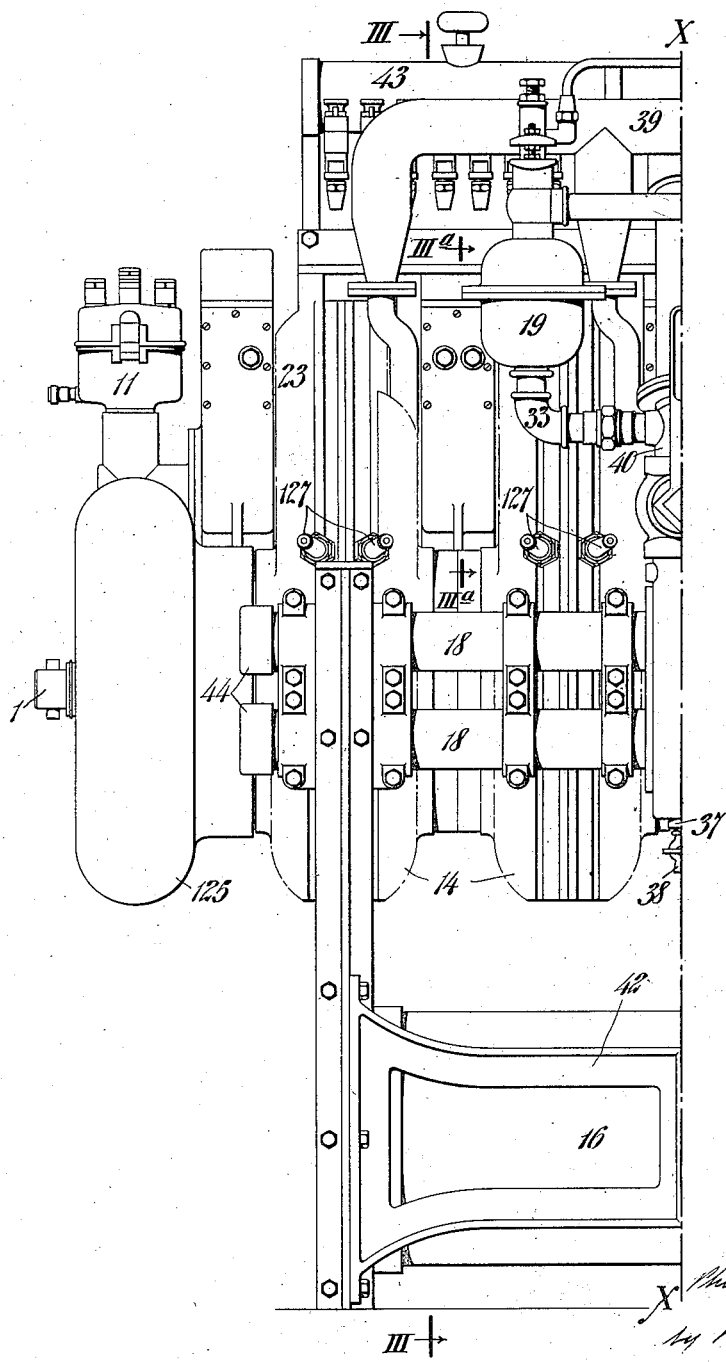

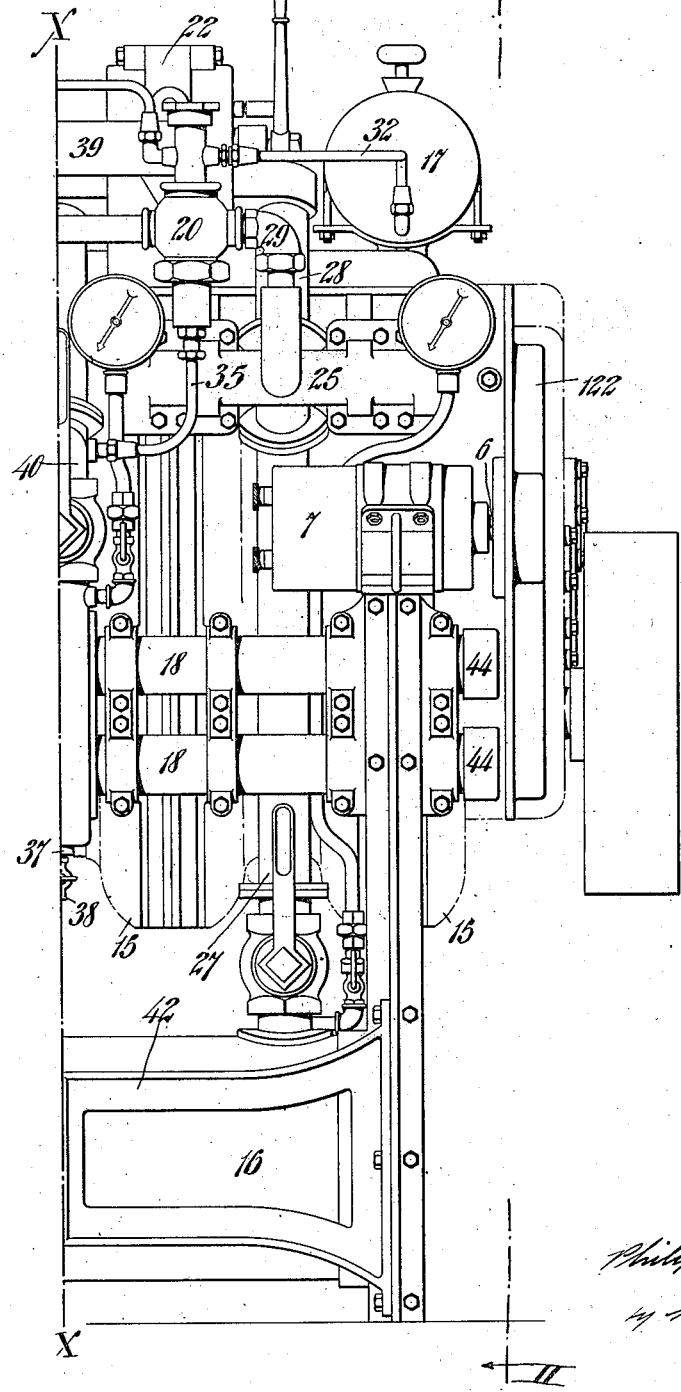

P. D. HIBNER

ROTARY ENGINE

Original Filed July 12, 1923    14 Sheets-Sheet 3

1,648,398

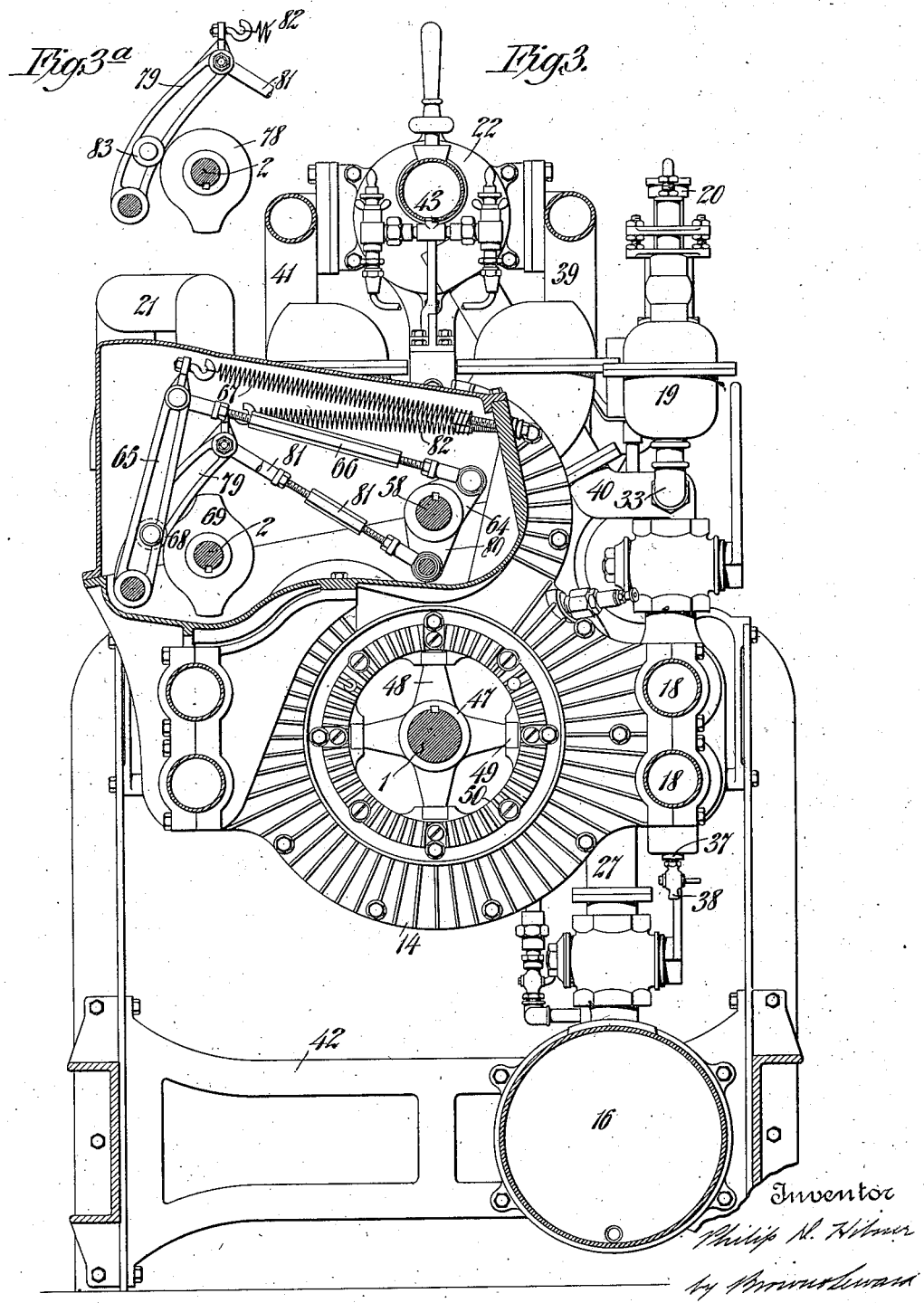

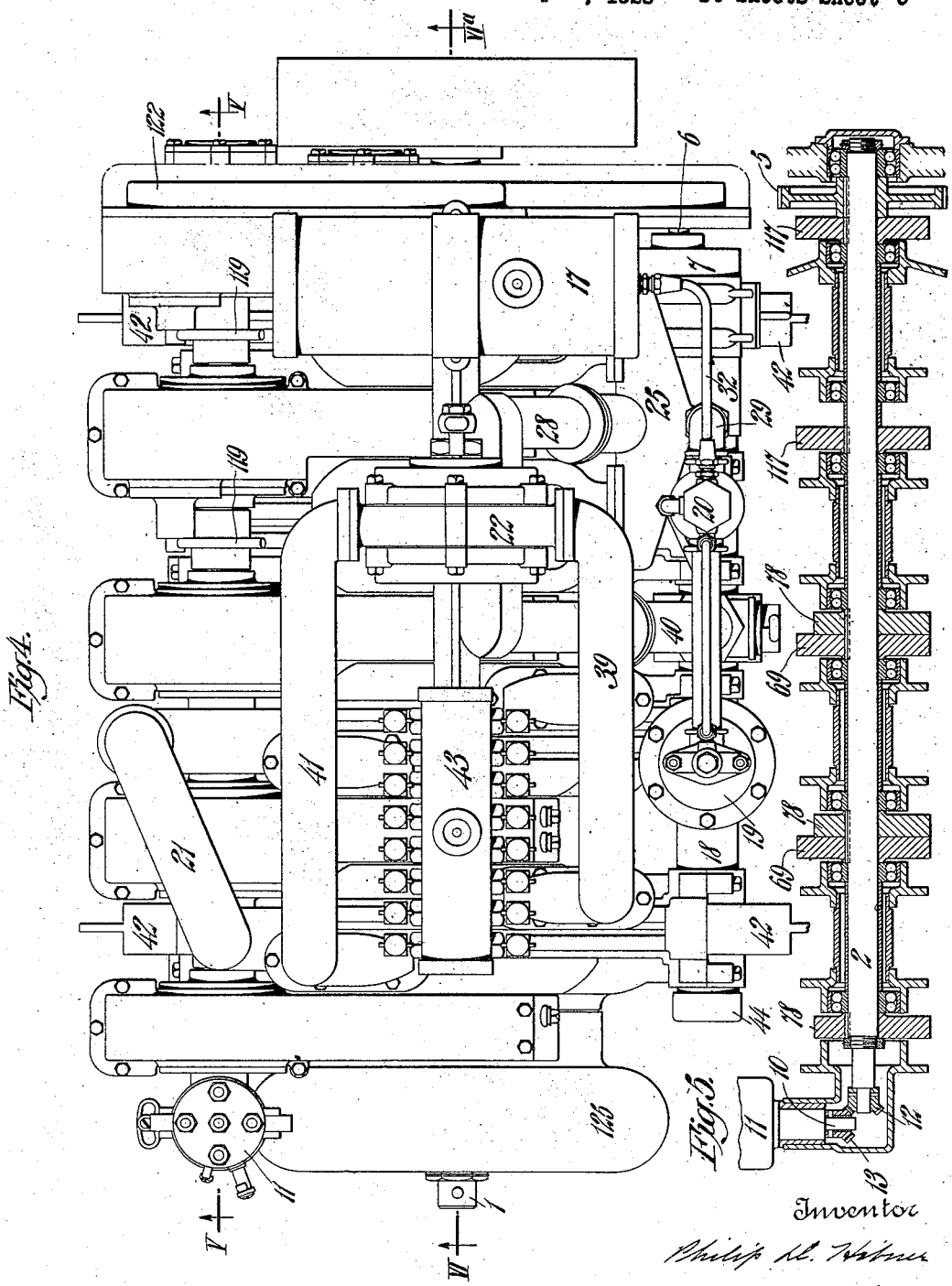

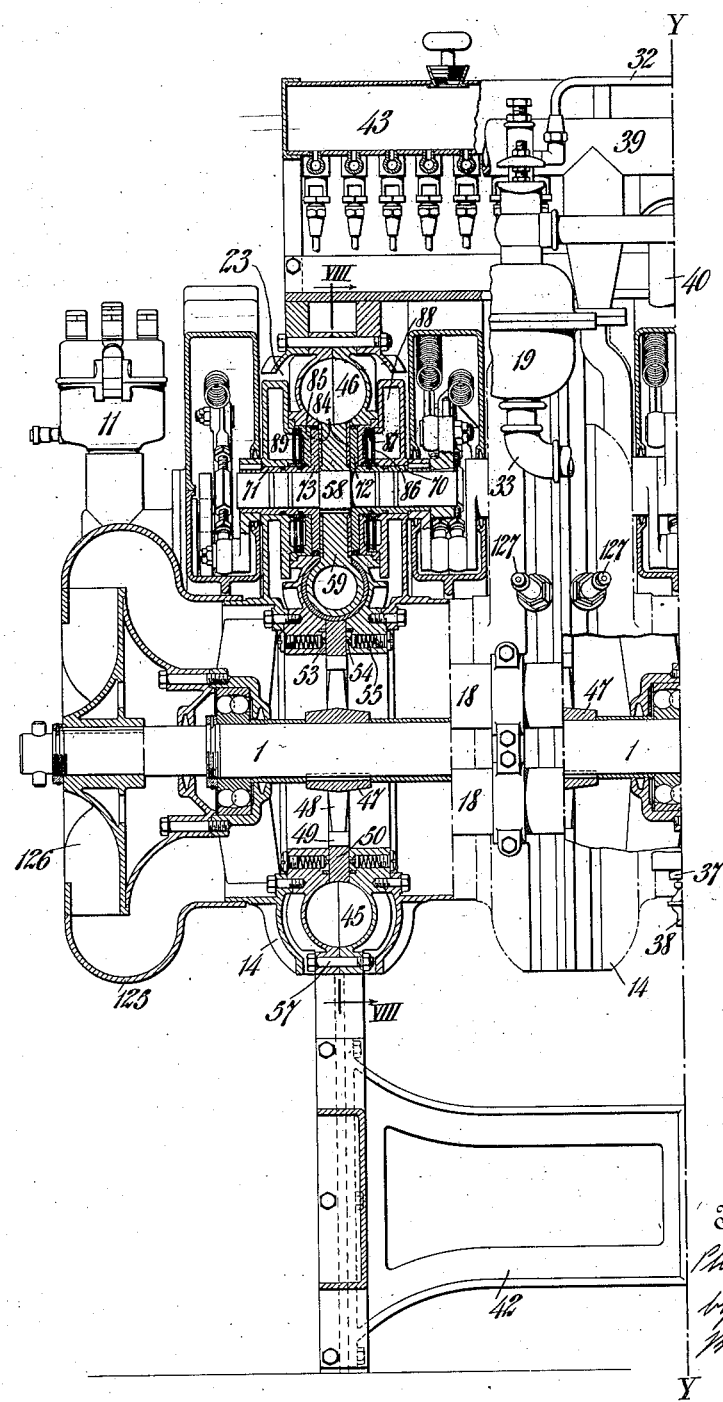

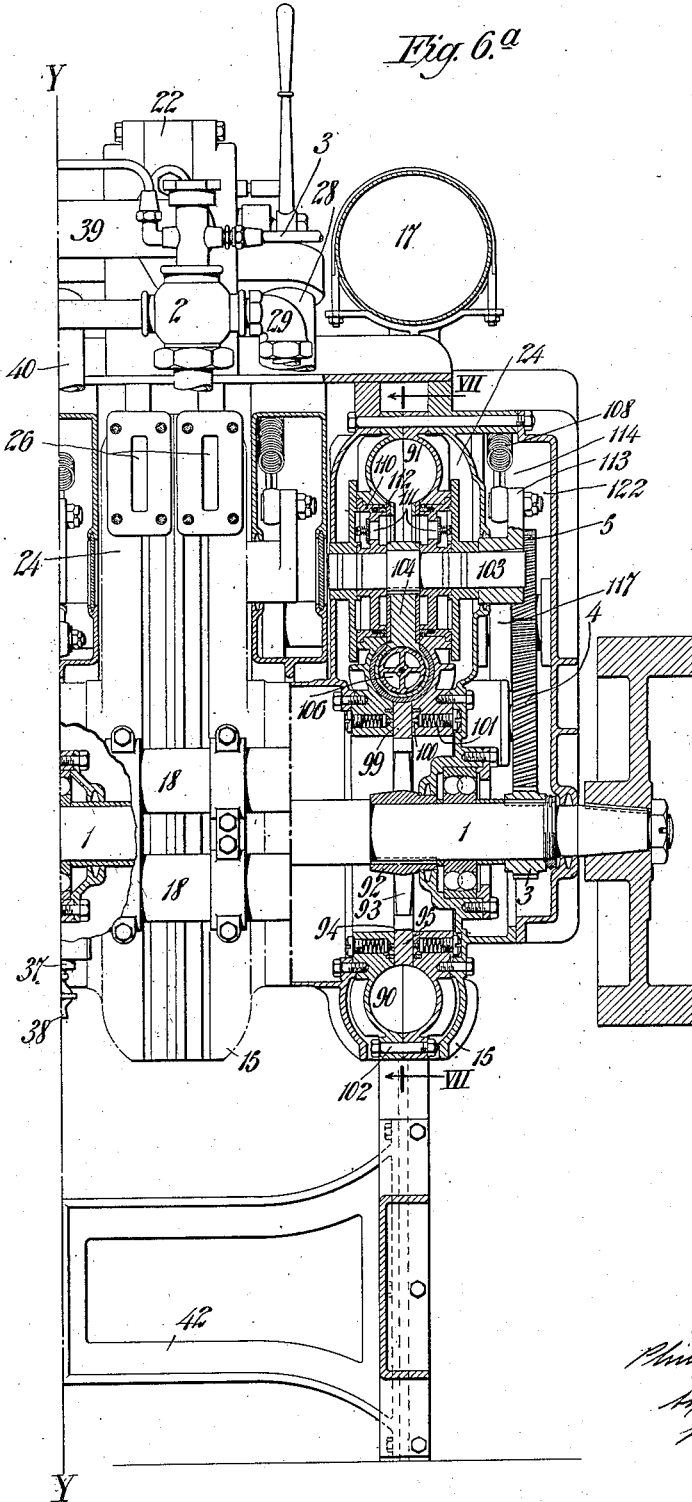

Nov. 8, 1927. 1,648,398

P. D. HIBNER

ROTARY ENGINE

Original Filed July 12, 1923  14 Sheets-Sheet 8

Inventor
Philip D. Hibner
by
Attorneys

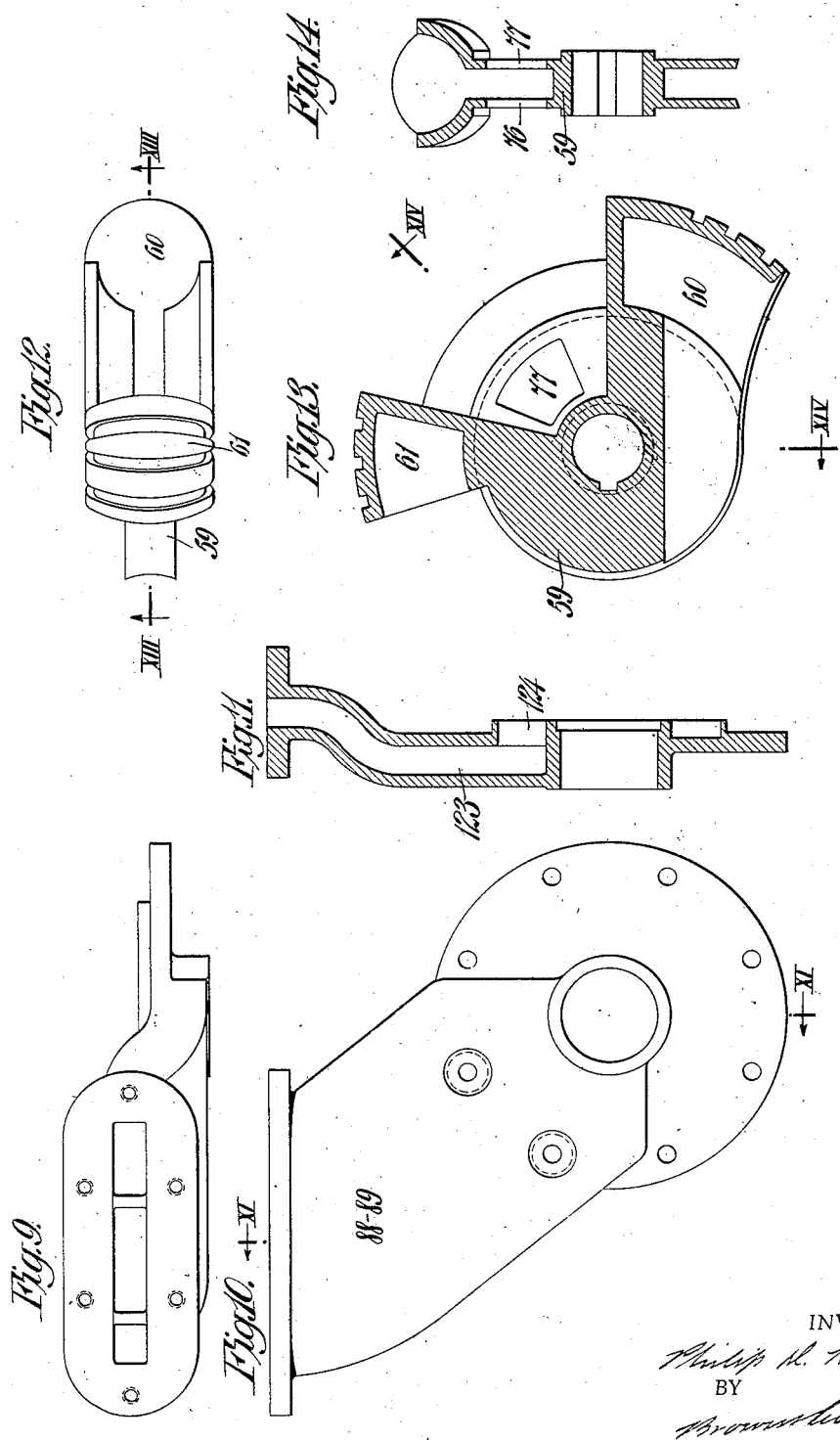

Nov. 8, 1927.
P. D. HIBNER
1,648,398
ROTARY ENGINE
Original Filed July 12, 1923    14 Sheets-Sheet 10
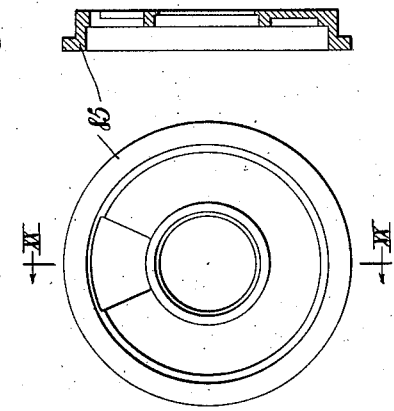
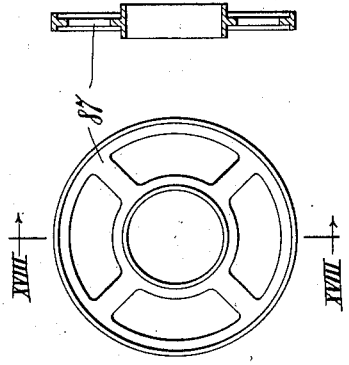
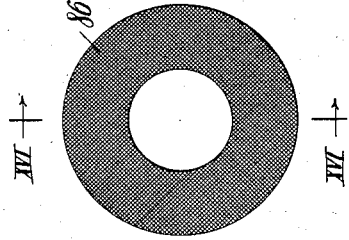
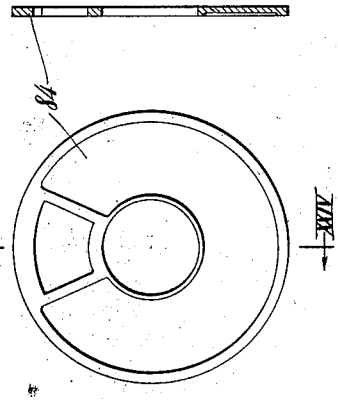
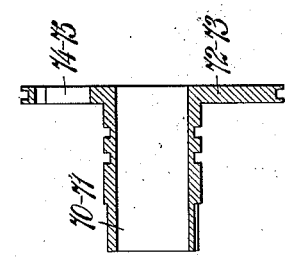
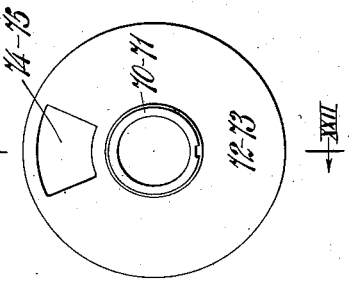
INVENTOR
BY
ATTORNEYS Nov. 8, 1927.
P. D. HIBNER
1,648,398
ROTARY ENGINE
Original Filed July 12, 1923   14 Sheets-Sheet 11
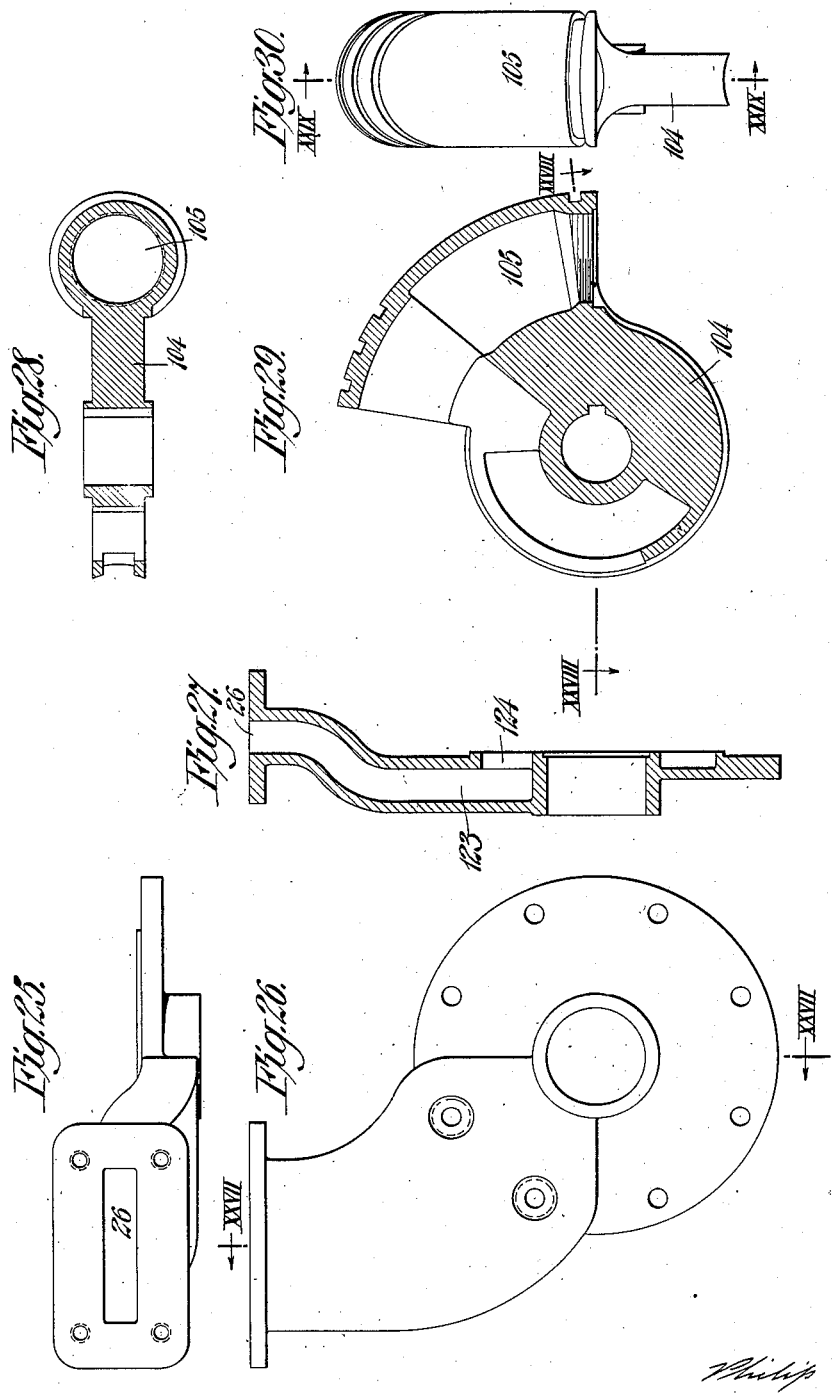
INVENTOR
Philip D. Hibner
BY
ATTORNEYS

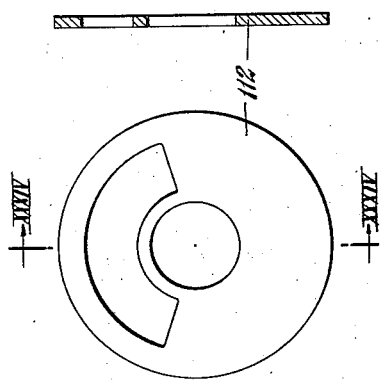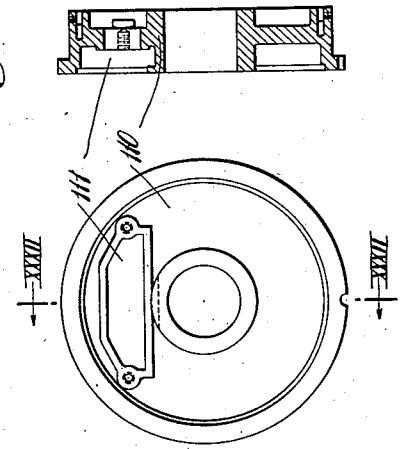

Nov. 8, 1927. 1,648,398
P. D. HIBNER
ROTARY ENGINE
Original Filed July 12, 1923   14 Sheets-Sheet 13
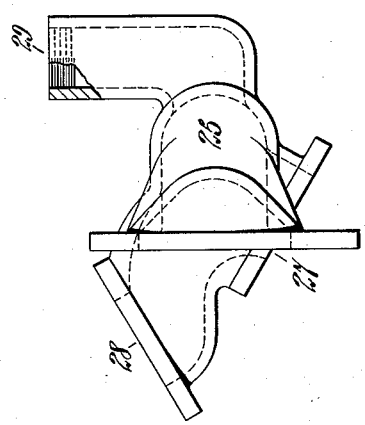
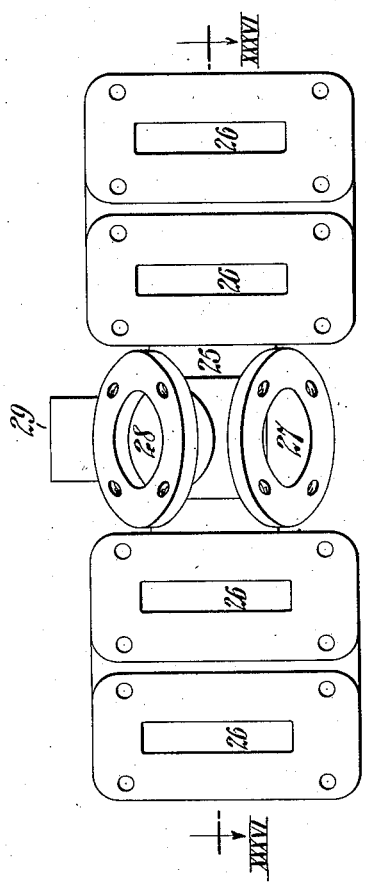
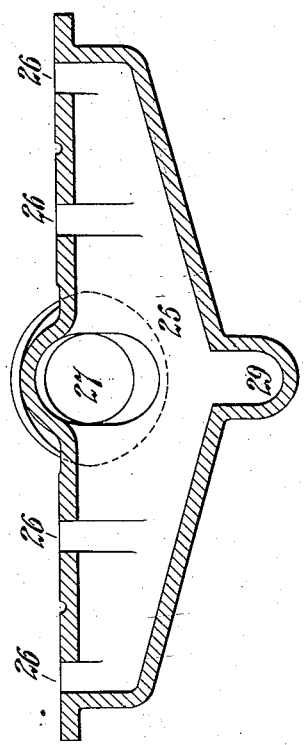
INVENTOR
BY
ATTORNEYS

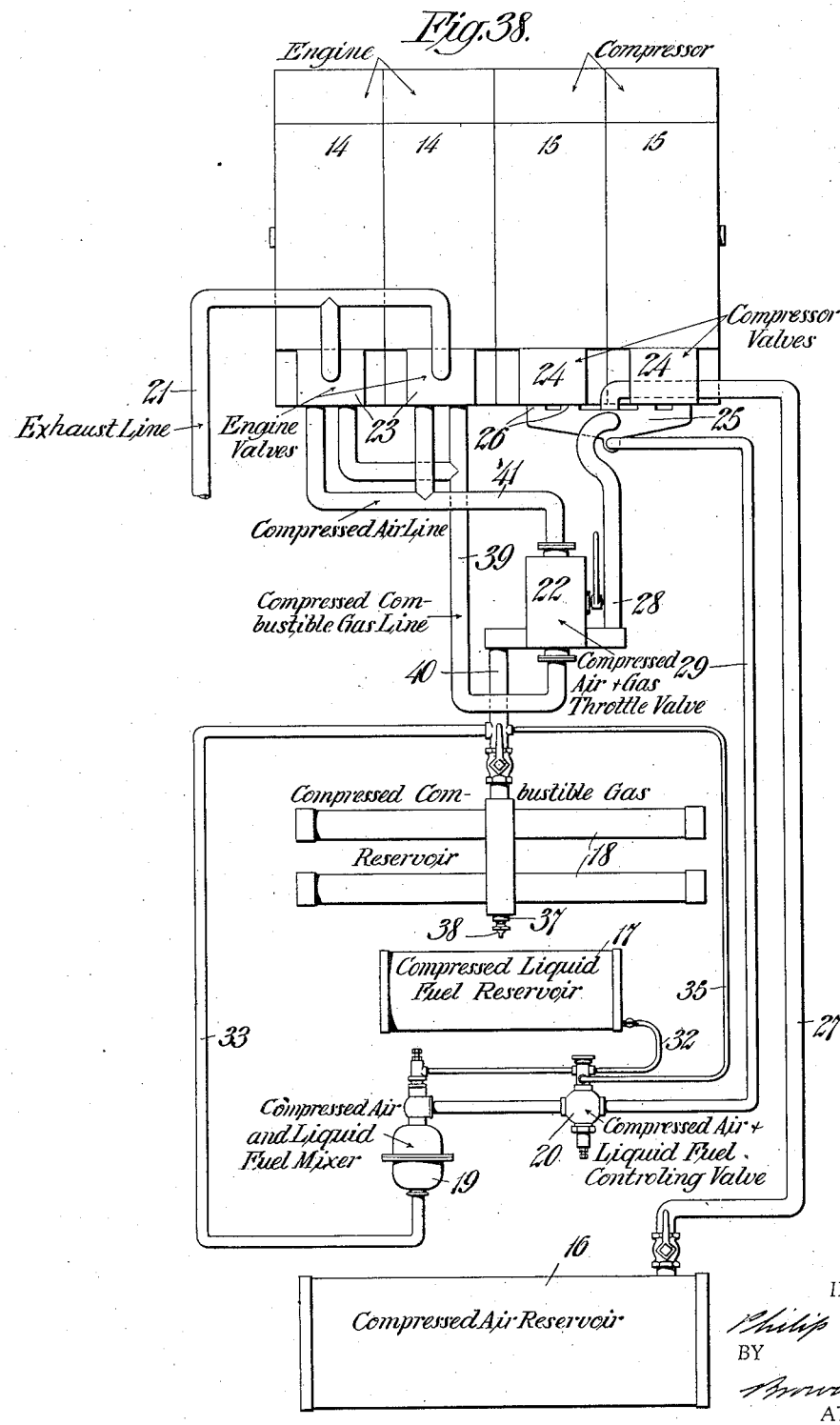

Patented Nov. 8, 1927.

1,648,398

UNITED STATES PATENT OFFICE.

PHILIP D. HIBNER, OF SEATTLE, WASHINGTON.

ROTARY ENGINE.

Application filed July 12, 1923, Serial No. 651,150. Renewed February 23, 1927.

The object of my invention is to provide improvements in the construction, form and arrangement of the various parts of a rotary engine of the internal combustion type, as will hereinafter be described and claimed, whereby the efficiency of an engine of this type will be materially increased; novel means being employed for producing a compressed combustible gas and for supplying the same to the engine in regulable quantities, novel means also being employed for supplying compressed air to the engine for starting, scavenging and cooling the same.

My invention more particularly comprises the following features:

A manifold for the air compressor portion of the engine, said manifold having one port in communication with the compressed air reservoir, a second port in communication with the throttle valve, a third port in communication with the compressed air and liquid fuel controlling valve and a fourth port in direct communication with the air compressor.

The novel arrangement of parts in the engine valve chest, whereby ignition pressure is balanced against two wings of an oscillating abutment.

The novel arrangement of the parts in the engine cylinder valve chest, whereby a very free exhaust is obtained.

The novel arrangement of parts in the valve chest of the air compressor whereby a very free exhaust therefrom is obtained.

A common cam shaft for the engine and compressor and a novel connection between the said cam shaft and the parts oscillated thereby, whereby a very rapid action of the parts is obtained.

An arrangement whereby practically all the operating parts may be run in a bath of oil.

A novel nozzle for the injection of the fuel and a novel nozzle for the injection of the compressed air into the engine.

A manual cut-out for each of the compressor cylinders.

A safety blow-off for the gas reservoir.

The utilization of the hollow frame bars on one side of the machine as the gas reservoir.

In the accompanying drawings:

Figs. 1 and 1ª represent the engine and compressor in side elevation.

Fig. 3 represents a transverse vertical section taken in the plane of the line III—III of Fig. 1.

Fig. 3ª represents a detail transverse vertical section taken in the plane of the line IIIª—IIIª of Fig. 1.

Fig. 4 represents the engine in top plan.

Fig. 5 represents a section taken along the cam shaft in the plane of the line V—V of Fig. 4.

Figs. 6 and 6ª represent a section taken in the plane of the line VI—VIª of Fig. 4.

Figure 7:
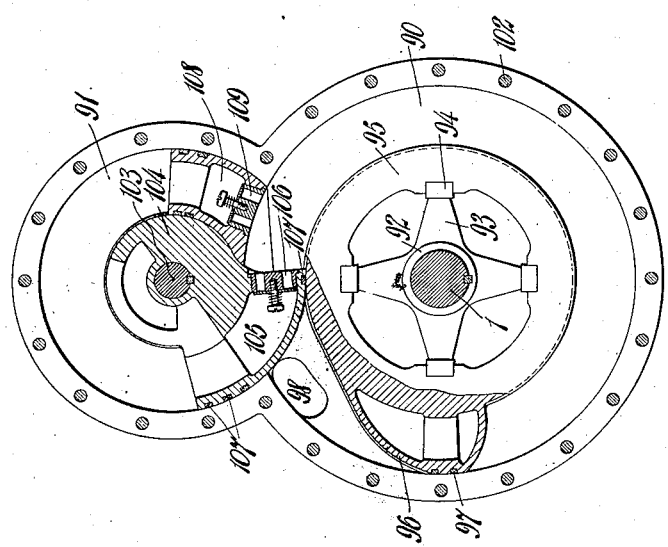

Fig. 7 represents a detail section taken in the plane of the line VII—VII of Fig. 6ª.

Figure 2:
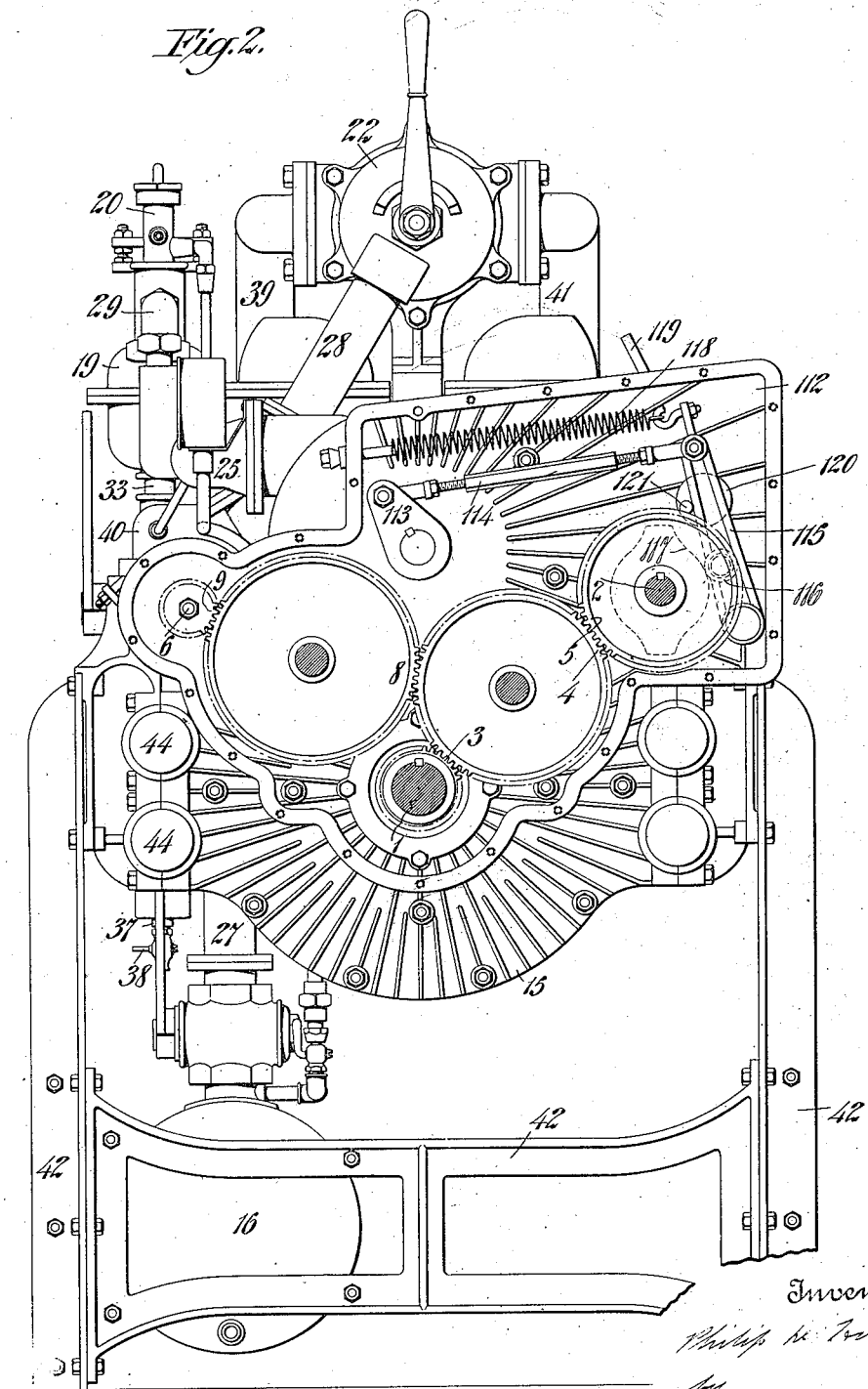
Fig. 2 represents a transverse vertical section taken in the plane of the line II—II of Fig. 1ª.
Figure 8:
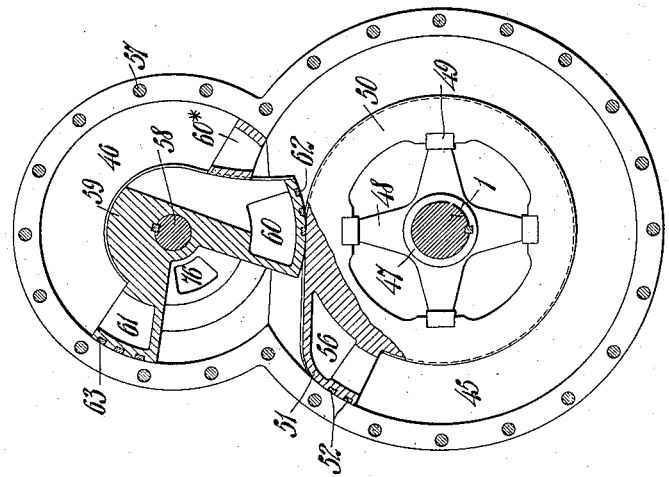

Fig. 8 represents a detail section taken in the plane of the line VIII—VIII of Fig. 6.

Figs. 9, 10, and 11 represent one of the engine gas inlet nozzles in top plan, side elevation and cross section respectively.

Figs. 12 to 24 inclusive represent detail views of the various parts of the engine valve mechanism.

Figs. 25, 26 and 27 represent one of the compressor nozzles, in top plan, side elevation and cross section respectively.

Figs. 28 to 34 inclusive represent detail views of the several parts of the compressor valve mechanism.

Figs. 35, 36 and 37 represent the air compressor manifold in rear elevation, longitudinal section and end elevation respectively.

Fig. 38 represents a diagrammatic view showing the relationship of the several parts of the engine and compressor.

The engine and the air compressor have a common drive shaft 1 and a common cam shaft 2 driven from the drive shaft 1 through the gears 3, 4 and 5. The shaft 6 of the generator 7 is driven from the main drive shaft 1 through the gears 4, 8 and 9. The shaft 10 of the commutator 11 is driven from the cam shaft 2 through the gears 12, 13.

The engine and the compressor may be each composed of one or more units, in the present instance two units each. The cylinder casing of each engine unit is denoted by 14, and the cylinder casing of each compressor unit is denoted by 15, through which cylinder casings the common drive shaft 1 extends.

The compressed air reservoir is denoted by 16, the compressed liquid fuel reservoir by 17 and the compressed combustible gas reservoir by 18. The compressed air and liquid fuel mixer is denoted by 19, the compressed air and liquid fuel controlling valve by 20, the engine exhaust passage by 21, the compressed air and gas throttle valve by 22, the valve chests of the engine cylinder by 23 and the valve chests of the air compressor by 24. A manifold 25 is in direct communication with the air compressor valve chests 24, through passages 26, with the compressor air reservoir 16 through the passage 27, with the throttle valve 22, through the passage 28, and with the mixer 19 through the controlling valve 20 by the passage 29. A liquid fuel supply line 32 leads from the reservoir 17 to the compressed air and liquid fuel mixer 19, through the controlling valve 20.

A compressed combustible gas supply line 33 leads from the mixer 19 to the compressed combustible gas reservoir 18. A branch line 35 leads from the line 33 to the controlling valve 20, whereby the valve is operated to close and open the compressed air and liquid fuel supply lines of the mixer, as the pressure in the combustible gas reservoir rises and falls to predetermined points. A drain 37 is provided for the compressed combustible gas reservoir 18, in which drain is located a drain cock 38 whereby any liquid fuel which is deposited in the reservoir 18 may be drained off at suitable times.

A compressed combustible gas supply passage 39 with its branches lead to the engine valve chests 23 from the manually operated throttle valve 22 and forms a continuation of the passage 40 which leads from the gas reservoir 18 to the throttle valve. A compressed air supply passage 41 with its branches also lead to the engine valve chests 23, from the throttle valve 22 and forms a continuation of the passage 28 from the manifold 25.

The compressed air and liquid fuel mixer 19 may be like the one represented in my United States Letters Patent No. 1,388,430, dated August 23, 1921; the compressed air and liquid fuel controlling valve 20 may be like the one represented in my United States Letters Patent No. 1,394,900, dated October 25, 1921; and the throttle valve 22 may be like the one represented in my United States Letters Patent No. 1,345,772, dated July 6, 1920.

A suitable supporting frame 42 for the engine and air compressor is provided, along the base of which frame the compressed air reservoir 16 is located. The compressed liquid fuel reservoir 17 is suitably mounted on top of the frame. A lubricating oil reservoir 43 is also mounted on top of the frame 42. The compressed combustible gas reservoir 18 comprises in the present instance, a pair of horizontally arranged tubes extending along one side of the engine and suitably supported in the frame, said tubes comprising the frame bars along that side of the engine. These tubes are provided with blowout caps 44.

In each engine cylinder unit the casing 14 is provided with intersecting annular piston and valve chambers 45, 46, both of which are circular in cross section, the piston chamber being somewhat larger than the valve chamber. The rotary shaft 1 of the engine has fixed thereto the hub 47 of the piston, which hub has spokes 48, the ends of which are located in sockets 49 in the rim member 50, of the piston. The rim member 50 is provided with a piston head 51 which is circular in cross section and fitted to travel around within the piston chamber 45. One or more packing rings 52 of the usual type encircle the piston head 51.

The piston chamber 45 has a continuous slot 53 through the inner wall, within which slot the rim member 50 of the piston travels. The opposite faces of this rim member 50 are engaged by the packing rings 54, yieldingly pressed against the rim member by the springs 55.

The piston head 51 is hollow to form a chamber 56 in open communication with the annular chamber 45 to lighten the head size and permit the ready cooling of the piston when the chamber is being scavenged by the charge of compressed air. The cylinder casing 14 and valve chest 23 of each cylinder unit is herein shown as formed of two half sections suitably united by the annular series of bolts 57.

The axle 58 of the oscillating abutment 59 is suitably mounted in bearings in the valve chest 23, the abutment 59 being provided with two hollow wings 60, 61, arranged about 90° apart, the said wings being circular in cross section and fitted to oscillate in the annular valve chamber 46. By making these wings hollow, not only is lightness obtained, but also provision is made for the efficient cooling of the said wings. These wings may be provided with suitable packing rings 62, 63 respectively.

The abutment 59 is oscillated by the cam shaft 2 through the rock arms 64, 65 and connecting rod 66, a spring 67 being arranged to yieldingly hold the oscillating abutment at the limit of its movement in one direction and to hold the stud or roller 68 of the arm 65 in engagement with its cam 69.

Oscillating sleeves 70 and 71 of two plate valves are mounted on the axle 58 of the oscillating abutment 59, upon opposite sides thereof, which sleeves are provided respectively with flanges 72, 73, provided with ports 74, 75 for opening and closing communication between the valve chamber 46 and the gas annular and air admission ports 76, 77 respectively. The sleeve 70 of one unit and the sleeve 71 of the next adjoining unit are controlled by a common cam 78 on the cam shaft 2, through the arms 79, 80 and connecting rod 81, a spring 82 serving to hold the oscillating sleeves at the limit of their movement in one direction and also serving to hold the stud or roller 83 against its cam 78.

The sleeve 71 of the end unit requires a cam 78 and connecting parts but the sleeves 70 and 71 of adjacent units can be operated from a single cam 78 as the gas and compressed air are admitted simultaneously to their respective units.

A stationary hollow thimble 60* serves both as an exhaust port and as a stop for limiting the movement of the oscillating abutment 59 in one direction and when the oscillating abutment is at the limit of its movement in the other direction, the rear wall of the wing 60 and the inner end of the thimble 60* serves as a continuation of the outer wall of the piston chamber 45. The exhaust passes from the engine chamber 45 through the thimble 60* into the valve chamber 46 in the valve chest 23 and from thence into the exhaust passage 21 where it may be lead to any desired point.

Wearing plates 84 are secured to the opposite sides of the oscillating abutment 59. The flanges 72, 73 of the plate valves are interposed between these wearing plates 84 and stationary rings 85. Suitable screens 86 carried by the rings 87 may be introduced between the rings 85 and the mouths of the gas and air nozzles 88 and 89 respectively. These nozzles 88 and 89 surround the sleeves 70, 71 of the plate valves.

In each air compressor cylinder unit the casing 15 is provided with intersecting annular piston and valve chambers 90 ad 91, both of which are circular in cross section, the piston chamber being somewhat larger than the valve chamber. The rotary shaft 1 of the combined engine and air compressor has fixed thereto the hub 92 of the piston, which hub has spokes 93, the ends of which are located in sockets 94 in the rim member 95 of the piston. The rim member 95 is provided with a hollow piston head 96 which is circular in cross section and fitted to travel around within the piston chamber 90. One or more packing rings 97, of the usual type, encircle the piston head 96. An air inlet port 98 is provided for the chamber 90. The piston chamber 90 has a continuous slot 99 through the inner wall, within which slot the rim member 95 of the piston travels. The opposite faces of this rim member are engaged by packing rings 100 yieldingly pressed against the rim member by the springs 101.

The cylinder casing 15 and valve chest 24 of each compressor cylinder unit is herein shown as formed of two half sections, suitably united by the annular series of bolts 102. The axle 103 of the oscillating abutment 104 is suitably mounted in bearings in the valve chest 24, the said abutment being provided with a hollow wing 105 having a valve port 106. This wing is circular in cross section and fitted to oscillate in the annular valve chamber 91 and may be provided with usual packing rings 107. A hollow thimble 108 is provided with a valve port 109 at its inner end, which thimble serves as a stop for limiting the movement of the oscillating abutment 104 in one direction.

Two stationary rings 110 are located upon opposite sides of the oscillating abutment 104, which rings are provided with valve ports 111 for the discharge of the compressed air from the chamber 91. Wearing plates 112 are provided on opposite sides of the abutment 104.

The abutment 104 is oscillated from the common cam shaft 2 by providing the shaft 103 with an arm 113, connected by the rod 114 to an arm 115 having a stud or roller 116 held in engagement with the cam 117 by the spring 118.

Any particular air compressor unit may be rendered inoperative by providing a hand lever 119 with a disc 120 having an eccentric pin 121 arranged to swing the arm 115 outwardly to bring its stud or roller 116 out of the path of the cam 117.

An oil tight housing 122 is provided for the valve mechanism above described, which housing at the end of the machine also includes the gears 3, 4, 5, 8 and 9.

The nozzles 123 have annular ports 124 for receiving the compressed air which passes through the valve ports 111, which nozzles form journals for the abutment shaft 103 and are in open communication with the manifold 25 through the passages 26 hereinbefore referred to.

A blower is provided for introducing air into the engine for cooling the same, which blower comprises the stationary casing 125 and the rotary member 126 which is keyed to the end of the drive shaft 1.

The piston chambers are provided with the spark plugs 127 which are operated at the proper times to ignite the compressed gas. It is understood that any desired ignition system may be employed. The engine may be started by manipulating the throttle valve to admit a charge of compressed air to the engine and exhaust the same. After the engine has been started, the valve mechanism is so timed that during one revolution thereof it will admit, ignite and exhaust a charge of compressed combustible gas and during the next revolution thereof it will admit and exhaust a charge of compressed air for scavenging and cooling the piston chamber, it being understood that the oscillating abutment first coacts with its gas inlet valve and then with its compressed air inlet valve by a movement of the abutment and valve simultaneously in opposite directions to ensure a rapid opening and closing of the ports. Furthermore, the ignition pressure is balanced between the two wings of the abutment, thus materially reducing the strain thereon. It will be noticed also that a very large outlet for the piston chamber is provided by the hollow thimble and the cutting away of the abutment at the back of the wing which is moved into and out of the piston chamber. Furthermore, the end of the thimble and the rear wall of the wing serve as a continuation of the outer wall of the piston chamber when the wing is moved into the valve chamber.

What I claim is:

1. In a rotary engine, a casing having an annular chamber, a piston head traveling therein, and valve mechanism for controlling the admission of combustible gas and compressed air to said chamber, comprising an oscillating two winged abutment and two oscillating valves coacting therewith.

2. In a rotary engine, a casing having an annular chamber, a piston head traveling therein and valve mechanism for controlling the admission of combustible gas and compressed air to said chamber, comprising an oscillating two winged abutment and two oscillating valves coacting therewith, and means for simultaneously moving the abutment and valves in opposite directions to ensure a quick opening and closing of the ports.

3. In a rotary engine, a casing having an annular chamber, a piston head traveling therein and valve mechanism for controlling the admission of motive fluid to said chamber, comprising an oscillating two winged abutment and an oscillating plate valve, both having a common axis.

4. In a rotary engine, a casing having an annular chamber, piston head traveling therein and valve mechanism for controlling the admission of motive fluid to said chamber, comprising an oscillating two winged abutment and an oscillating plate valve, both having a common axis, and means for simultaneously moving the abutment and valve in opposite directions to ensure a quick opening and closing of the ports.

5. In a rotary engine, a casing having an annular chamber, a piston head traveling therein and valve mechanism for controlling the admission of combustible gas and compressed air to said chamber, comprising an oscillating two winged abutment and two oscillating plate valves coacting with the opposite sides of said abutment, and a common cam shaft for oscillating the abutment and valves simultaneously in opposite directions to ensure a quick opening and closing of the ports.

6. In a rotary engine, a casing having an annular chamber, a piston head traveling therein and valve mechanism for controlling the admission of combustible gas and compressed air to said chamber, comprising a rock shaft, a two winged oscillating abutment fixed thereto and two oscillating plate valves coacting with the opposite sides of said abutment and having their sleeves mounted on said rock shaft, and means for oscillating the abutment and valves simultaneously in opposite directions to obtain a rapid opening and closing of their ports.

7. In a rotary engine, a casing having an annular chamber, a piston head traveling therein and valve mechanism for controlling the admission of combustible gas and compressed air to said chamber, comprising a rock shaft, a two winged oscillating abutment fixed thereto and two oscillating plate valves coacting with the opposite sides of said abutment and having their sleeves mounted on said rock shaft, means for oscillating the abutment and valves simultaneously in opposite directions to obtain a rapid opening and closing of their ports, and wearing plates between said abutment and valves.

8. In a rotary engine, a casing having intersecting annular piston and valve chambers, a piston head traveling in the piston chamber, a two winged abutment oscillating in the valve chamber, and oscillating plate valves coacting with the opposite sides of the abutment.

9. In a rotary engine, a casing having intersecting annular piston and valve chambers, a piston head traveling in the piston chamber, a two winged abutment oscillating in the valve chamber, oscillating plate valves coacting with the opposite sides of the abutment, and a hollow stop for limiting the movement of the abutment in one direction.

10. In a rotary engine, a casing having intersecting annular piston and valve chambers, a piston head traveling in the piston chamber, a two winged abutment oscillating in the valve chamber, oscillating plate valves coacting with the opposite sides of the abutment, and a hollow stop for limiting the movement of the abutment in one direction, the end of said stop and back of one of said wings forming a continuation of the wall of the piston chamber when the wing is rocked out of the piston chamber to the limit of its movement in the opposite direction.

11. In a rotary engine, a casing having an annular piston chamber, a piston head traveling therein, valve mechanism for controlling the admission of combustible gas and compressed air to said chamber, comprising a two winged abutment and two plate valves coacting with the opposite sides of said abutment, valve mechanism for oscillating the abutment and valves, comprising a common cam shaft, cams thereon and operative connections between the abutment, valves and cams.

12. In a rotary engine, a casing having an annular piston chamber, a piston head traveling therein, valve mechanism for controlling the admission of combustible gas and compressed air to said chamber, comprising a two winged abutment and two plate valves coacting with the opposite sides of said abutment, valve mechanism for oscillating the abutment and valves, comprising common cam shafts, cams thereon, operative connections between the abutment, valves and cams, and an oil tight housing for said cams and connections.

13. In a rotary engine, a casing having intersecting annular piston and valve chambers, a piston head traveling in the piston chamber, a two winged abutment oscillating in the valve chamber, oscillated plate valves coacting with the opposite sides of the abutment, and a hollow stop for limiting the movement of the abutment in one direction, the abutment being cut away to give a freer outlet for the piston chamber.

14. In a rotary engine, a casing having an annular chamber, a piston head traveling therein, an oscillating abutment and oscillating valves coacting therewith to control the alternate admission of combustible gas and compressed air to the piston chamber, and means for alternately moving the abutment and one of the oscillating valves simultaneously in opposite directions to ensure a quick opening and closing of the ports.

15. In a rotary engine, a casing having intersecting piston and valve chambers, a piston traveling in the piston chamber, a two winged abutment oscillating in the valve chamber, a valve for controlling the admission of combustible gas to the valve chamber between said wings whereby the ignition pressure is balanced against said two wings.

In testimony, that I claim the foregoing as my invention, I have signed my name this 28th day of June, 1923.

PHILIP D. HIBNER.